United States Patent [19]

Suzuki et al.

[11] Patent Number: 5,339,709
[45] Date of Patent: Aug. 23, 1994

[54] CONTROL SYSTEM FOR A COMBINED SHIFT IN WHICH AN ACCUMULATOR IS DISCONNECTED IN AN AUTOMATIC TRANSMISSION

[75] Inventors: Akira Suzuki, Chiryu; Kazunori Ishikawa; Kunihiro Iwatsuki, both of Toyota; Hidehiro Oba, Aichi; Hiromachi Kimura; Hideaki Otsubo, both of Toyota, all of Japan

[73] Assignees: Aisin AW Co., Ltd.; Toyota Jidosha Kabushiki Kaisha, both of Japan

[21] Appl. No.: 957,188

[22] Filed: Oct. 7, 1992

[30] Foreign Application Priority Data

Oct. 9, 1991 [JP] Japan .................. 3-262383

[51] Int. Cl.$^5$ ............................................. B60K 41/06
[52] U.S. Cl. ................................................ 477/145
[58] Field of Search ............... 74/866, 867; 364/424.1

[56] References Cited

U.S. PATENT DOCUMENTS

| 4,616,521 | 10/1986 | Akashi et al. | 74/866 X |
| 4,727,773 | 3/1988 | Sumiya et al. | 74/867 |
| 4,733,580 | 3/1988 | Kubo et al. | 74/866 |
| 5,150,296 | 9/1992 | Iwatsuki et al. | 74/866 X |

Primary Examiner—Leslie A. Braun
Assistant Examiner—Khoi Ta
Attorney, Agent, or Firm—Lorusso & Loud

[57] ABSTRACT

A control system is provided for an automatic transmission which has primary and second shifting units connected together to provide multi-stage speed ranges. Upon performing a combined shift, a hydraulic control circuit disconnects a hydraulic servomotor and its corresponding accumulator and the pressure in the servomotor is controlled by an electrical signal. When a decision for a second shift is made in the course of the combined shift, the pressure in a hydraulic servomotor for a downshift frictional engagement element is controlled by an electrical signal to return the element to its position before the combined shift while monitoring the number of revolutions of a rotating member in the transmission. As a consequence, a particular speed stage is configured and a shift signal corresponding to the decision of the second shift is outputted to the circuit. Since the shift signal corresponding to the decision of the second shift is not outputted until the particular shift is configured, the servomotor and the accumulator remain disengaged.

1 Claim, 6 Drawing Sheets

| SPEED RANGE | C1 | C2 | C0 | B0 | B1 | B2 | B3 | Speed stage of shifting unit | |
|---|---|---|---|---|---|---|---|---|---|
| | | | | | | | | Secondary | Primary |
| P,N | | | | | | | | | |
| Rev 1 | | XX | XX | | | | XX | Low | Rev 1 |
| For 1 | XX | | XX | | | | X | Low | For 1 |
| 2 | XX | | | XX | | | X | High | 1 |
| 3 | XX | | XX | | X | XX | | Low | 2 |
| 3.5 | XX | | | XX | X | XX | | High | 2 |
| 4 | XX | XX | XX | | | XX | | Low | 3 |
| 5 | XX | XX | | XX | | XX | | High | 3 |

CONTROL SYSTEM FOR A COMBINED SHIFT IN WHICH AN ACCUMULATOR IS DISCONNECTED IN AN AUTOMATIC TRANSMISSION

BACKGROUND OF THE INVENTION

1. Field of the Invention

This invention relates to a control system for an automatic transmission, especially to a control system for an automatic transmission having a primary shifting unit and a secondary shifting unit connected to the primary shifting unit and capable of achieving multi-stage speed ranges.

2. Description of the Related Art

In an automatic transmission with an overdrive mechanism, 4-forward/1-reverse speed stages have heretofore been achieved by combining a secondary shifting unit, which includes an overdrive planetary gear unit, with a 3-forward/1-reverse primary shifting unit.

In the above case, the secondary shifting unit is constructed of an input shaft for inputting rotation obtained at a torque converter, a planetary gear unit, an overdrive brake for connecting or disconnecting a sun gear of the planetary gear unit relative to the housing of the automatic transmission, an overdrive direct clutch for connection or disconnection between the sun gear and a carrier, an output shaft connected to a ring gear, etc. The planetary gear unit can be locked up by bringing the overdrive brake into engagement with the housing of the automatic transmission to effect acceleration and hence to connect the overdrive direct clutch.

The primary shifting unit, on the other hand, is provided with two planetary gear units. Individual elements of both the planetary gear units are selectively connected through engagement or disengagement of corresponding brakes and clutches, whereby 3-forward/1-reverse speed stages are obtained.

In the speed stages ranging from the first speed to the third speed, the overdrive planetary gear is kept locked up; in the fourth speed stage the overdrive planetary gear unit is brought into an accelerated state, whereby 4-forward/1-reverse speed stages are achieved.

The brakes and clutches, which are adapted to selectively connect the individual elements of both of the above-described planetary gear units, are connected or disconnected by feeding or draining hydraulic fluid to or from their corresponding hydraulic servomotors. A hydraulic circuit is therefore arranged so that pressure-regulated fluids are fed or drained to or from the respective hydraulic servomotors by changing over various valves.

To reduce shift shocks and also to diversify shift characteristics in the above automatic transmission in view ever-increasing engine torque, automatic transmissions have been proposed in which an accelerating function of an overdrive planetary gear unit is added to achieve 5-forward/1-reverse speed stages (see, for example, U.S. Pat. No. 4,733,580 issued Mar. 29, 1988 to Kubo et al.). In this case, for example, a new second speed stage is incorporated between the conventional first and second speed stages so that the conventional second, third and fourth speed stages are changed to the third, fourth fifth speed stages, respectively. In the new second speed stage, the primary shifting unit is maintained in the state of the first speed stage while in the secondary shifting unit, the overdrive brake and the housing of the automatic transmission are engaged with each other to achieve acceleration.

However, the above-described conventional automatic transmission may perform a combined shift wherein one of the primary shifting unit and the secondary shifting unit performs a downshift and the other executes an upshift. If a decision to execute a second shift is made in the course of the execution of the first shift, a shift shock may occur.

Here, a shift such that either one of the primary shifting unit and the secondary shifting unit performs a downshift and the other executes an upshift is defined as a "combined shift".

When the speed of revolution of an engine reaches a shift point for another speed stage on the high-speed side, for example, as a result of a reduction in engine load during the combined shift, a decision is made as to whether a second shift is needed or not. Where the other speed stage is a speed stage requiring reconfiguration of the secondary shifting unit into its accelerating state again, a first frictional engagement element which is being released in the above-described combined shift is brought into engagement again. The engaging hydraulic pressure for the first frictional engagement element temporarily drops, leading to occurrence of a shift shock.

In other words, in the combined shift described above, the first frictional engagement element is released to bring the secondary shifting unit into a lockup state and a frictional engagement element is engaged. The primary shifting unit is hence brought into an accelerating state. If the release of the first frictional engagement element in the secondary shifting unit takes place after the engagement of the second frictional engagement element in the primary shifting unit in the above instance, the downshift of the secondary shifting unit is delayed. Overall, as a total mechanism, a downshift is performed once an up-shift is effected, thus creating a shift shock.

The transmission is, therefore, designed that upon releasing the first frictional engagement element, the hydraulic servomotor for the first frictional engagement element is disconnected from its corresponding accumulator and the second frictional engagement element is engaged while controlling the hydraulic pressure in the hydraulic servomotor.

If the decision for the second shift is made while the combined shift is in progress by such a control, it becomes necessary to engage the first frictional engagement element again while the fluid in the hydraulic servomotor is drained to release the first frictional engagement element. As a result, the once-disconnected accumulator is connected again. At this time, the fluid in a line is fed to the accumulator which has begun to operate. The hydraulic pressure in the hydraulic servomotor therefore drops suddenly although this drop is temporary. Overall, the effect on the whole automatic transmission of the rapid downshift during the combined shift hence makes the shift shock greater.

SUMMARY OF THE INVENTION

An object of this invention is therefore to provide a control system for an automatic transmission, which control system overcomes the above-described problems of the conventional control systems for automatic transmissions and produces no shift shock when a decision for a second shift is made in the course of a combined shift of a primary shifting unit and a secondary shifting unit.

Accordingly, the present invention provides a control system for an automatic transmission which has a primary shifting unit and a secondary shifting unit connected to the primary shifting unit and can achieve multi-stage speed ranges.

The control system is provided with means for detecting running conditions of the vehicle and means for deciding, upon receipt of signals indicative of the running conditions, whether or not a first shift is needed and when the need for a first shift is decided, generating a first shift signal. Upon receipt of the first shift signal from the shift deciding means, a hydraulic control circuit selectively feeds or drains hydraulic fluid to or from hydraulic servomotors for respective frictional engagement elements.

The control system is provided further with means for controlling the hydraulic pressures in the respective hydraulic servomotors and means for detecting the speed of revolution of a rotating member in the automatic transmission.

When the primary and secondary shifting units perform a combined shift such that one of the primary and secondary shifting units performs a downshift and the other performs an upshift, the servomotor pressure control means hydraulically disconnects the hydraulic servomotor for one of the frictional engagement elements, that one of the frictional engagement elements being provided for downshifts, and its corresponding accumulator to control the hydraulic pressure in the hydraulic servomotor by a first electric signal. When the shift deciding means has made a decision for a second shift in the course of the combined shift, the hydraulic pressure in the hydraulic servomotor for that one frictional engagement element is controlled by a second electrical signal while monitoring the speed of revolution detected by the revolution number detection means, whereby the one frictional engagement element is returned to its position before the combined shift to configure a particular speed stage and, subsequent to the configuration of the particular speed stage, a shift signal indicative of the decision for the second shift is outputted to the hydraulic control circuit.

The running condition detecting means are provided to detect running conditions of the vehicle. Upon receipt of signals indicative of the running conditions detected by the running condition detecting means, the shift deciding means makes a decision as to whether or not a shift is needed and when the shift is needed, a shift signal is generated. The shift signal generated by the shift deciding means is fed to the hydraulic control circuit, whereby solenoid valves, linear solenoid valves and/or the like are controlled to selectively feed or drain hydraulic fluid to or from the hydraulic servomotors for frictional engagement elements.

The control system is also provided with servomotor pressure control means for controlling the hydraulic pressure in each of the hydraulic servomotors and also with the speed of revolution detection means for detecting the speed of revolution of a rotating member in the automatic transmission.

When the control system performs a combined shift such that one of the primary shifting unit and the secondary shifting unit performs a downshift and the other executes an upshift, the servomotor pressure control means hydraulically disconnects the hydraulic servomotor for the downshift frictional engagement element and the accumulator corresponding to the hydraulic servomotor and the hydraulic pressure in the hydraulic servomotor is controlled by an electrical signal, whereby the timing between the hydraulic servomotor for the downshift engagement element and the hydraulic servomotor for the upshift frictional engagement element is adjusted.

Further, when the shift deciding means has decided a second shift in the course of the combined shift, the hydraulic pressure in the hydraulic servomotor for the downshift frictional engagement element is controlled by an electrical signal while monitoring the speed of revolution detected by the revolution detection means, whereby the downshift frictional engagement element is returned to its position before the combined shift. As a result, a particular speed stage is configured and, subsequent to the configuration of the particular speed stage, the shift signal by the decision for the second shift is outputted to the hydraulic control circuit. Since the shift signal by the decision for the second shift is not outputted to the hydraulic control circuit until the particular speed stage is configured, the hydraulic servomotor and the accumulator will remain disengaged.

The hydraulic pressure in the hydraulic servomotor therefore does not drop when the accumulator is connected again. Moreover, the state of the combined shift is maintained from the combined shift to the achievement of the second shift, thereby making it possible to avoid occurrence of a shift shock.

DETAILED DESCRIPTION OF THE INVENTION AND PREFERRED EMBODIMENT

One embodiment of the present invention will hereinafter be described in detail with reference to the drawings.

Figure 1:
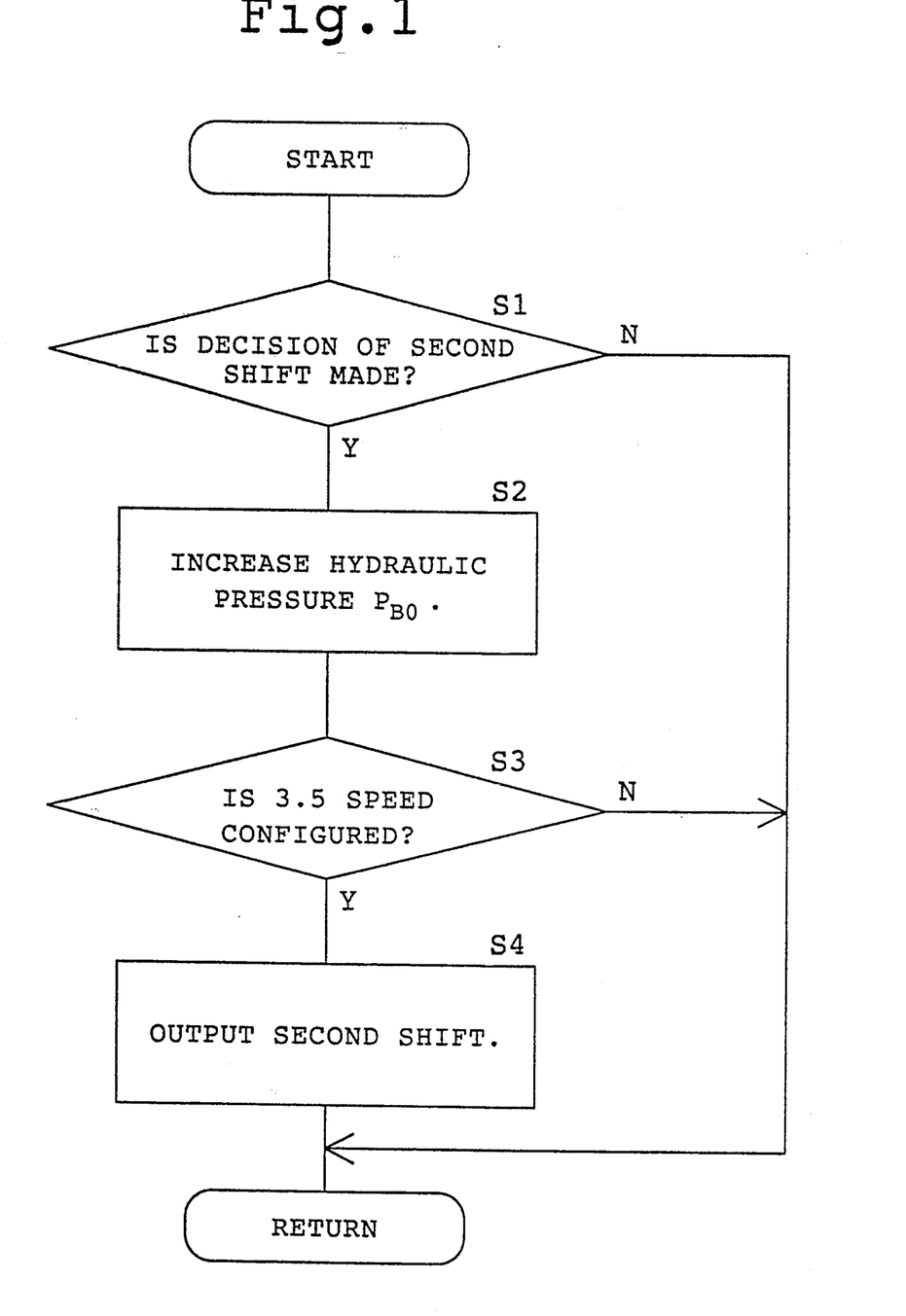
FIG. 1 is a flow chart of a control system for an automatic transmission, which control system represents one embodiment of the present invention.
Figure 2:
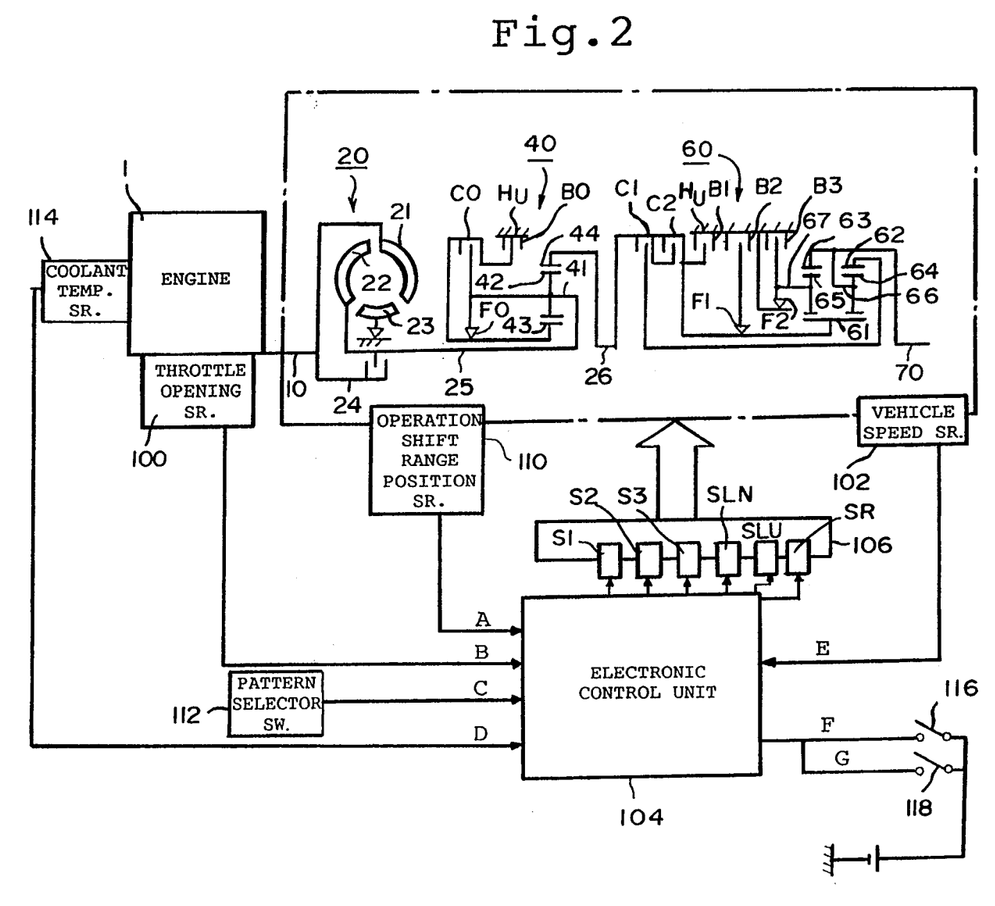
FIG. 2 is a simplified block diagram of the control system of the present invention.

With reference to FIGS. 1 and 2, the automatic transmission includes a torque converter 20, a secondary shifting unit 40 and a 3-forward/1-reverse primary shifting unit 60. The torque converter 20 is equipped with a pump impeller 21, a turbine runner 22, a stator 23 and a lockup clutch 24. The pump impeller 21 is connected to a crankshaft 10 of an engine 1, while the turbine runner 22 is connected via an input shaft 25 to the planetary gear unit in the secondary shifting unit 40.

In the secondary shifting unit 40, a planetary pinion 42 rotatably supported by the carrier 41 is provided in meshing engagement with a sun gear 43 and a ring gear 44. Between the sun gear 43 and the carrier 41, are a third clutch C0 and a third one-way clutch F0. A fourth brake B0 is also arranged between the sun gear 43 and housing Hu.

The primary shifting unit 60 is provided with a front-side planetary gear unit and a rear-side planetary gear unit. These planetary gear units have a common sun gear 61, and are provided with ring gears 62,63, planetary pinions 64,65 and carriers 66,67, respectively.

The ring gear 44 of the secondary shifting unit 40 is connected to the ring gear 62 via an input shaft 26 and a first clutch C1. A second clutch C2 is arranged between the first clutch C1 and the sun gear 61. The carrier 66 is connected to the ring gear 63, and the carrier 66 and the ring gear 63 are connected to an output shaft 70. Disposed between the carrier 67 and the housing Hu, on the other hand, are a third brake B3 and a second one-way clutch F2. Between the sun gear 61 and the housing Hu, a second brake B2 is mounted via a first one-way clutch F1. Further, a first brake B1 is interposed between the sun gear 61 and the housing Hu.

An electronic control unit 104 receives as inputs an operation shift range position signal A from an operation shift range position sensor 110, a throttle opening signal B from a throttle opening sensor 100 for detecting the opening of a throttle valve, which opening reflects the level of load on the engine 1, a pattern selecting signal C from a pattern selector switch 112, an engine coolant temperature signal D from a coolant temperature sensor 114, a vehicle speed signal E from a vehicle speed sensor 102 for detecting the vehicle speed, a brake pedal signal F from a brake pedal switch 116, and a parking brake signal G from a parking brake switch 118. By the electronic control unit 104, first to third solenoid valves S1–S3 and linear solenoid valves SLU, SLN and SR, all arranged in a hydraulic control circuit 106, are controlled in accordance with a preset shift pattern, whereby the individual clutches and brakes are engaged or disengaged to control shifts.

The operation shift range position sensor 110 detects shift range positions N, D,3, 2, L, R of a shift lever which is operated by a driver. The pattern selector switch 112 is used to select a drive pattern such as E (economy) running or P (power) running. The coolant temperature sensor 114 detects the temperature of the coolant of the engine 1. The brake pedal switch 116 detects actuation of a brake pedal while the parking brake switch 118 detects actuation of a parking brake.

Figure 3:
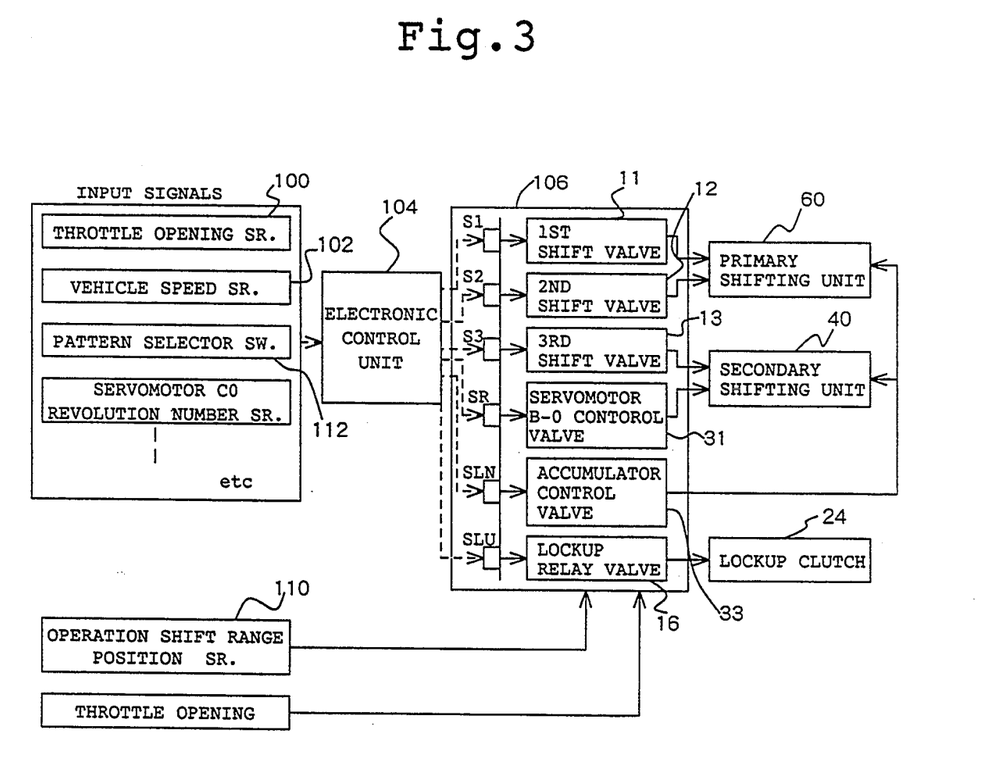
FIG. 3 is a control block diagram of the control system the present invention.

Further, as illustrated in FIG. 3, the first solenoid valve S1 controls a first shift valve 11 of the primary shifting unit 60, the second solenoid valve 82 controls a second shift valve 12 of the primary shifting unit 60, and the third solenoid valve S3 governs a third shift valve 13 which serves to change over the secondary shifting unit 40 between its accelerating state and its lockup state. On the other hand, the linear solenoid valve SR controls a B-0 control valve 31 of the secondary shifting unit 40, the linear solenoid valve SLN controls the back pressure of a B-0 accumulator for a fourth brake B0 via an accumulator control valve 33, and linear solenoid valve SLU governs a lockup clutch 24 via a lockup relay valve 16. The operation of the automatic transmission of the above-described construction will be described next with reference to FIG. 4, in which "XX" indicates engagement whereas "X" designates engagement which takes place only when an engine brake is applied.

Figure 4:
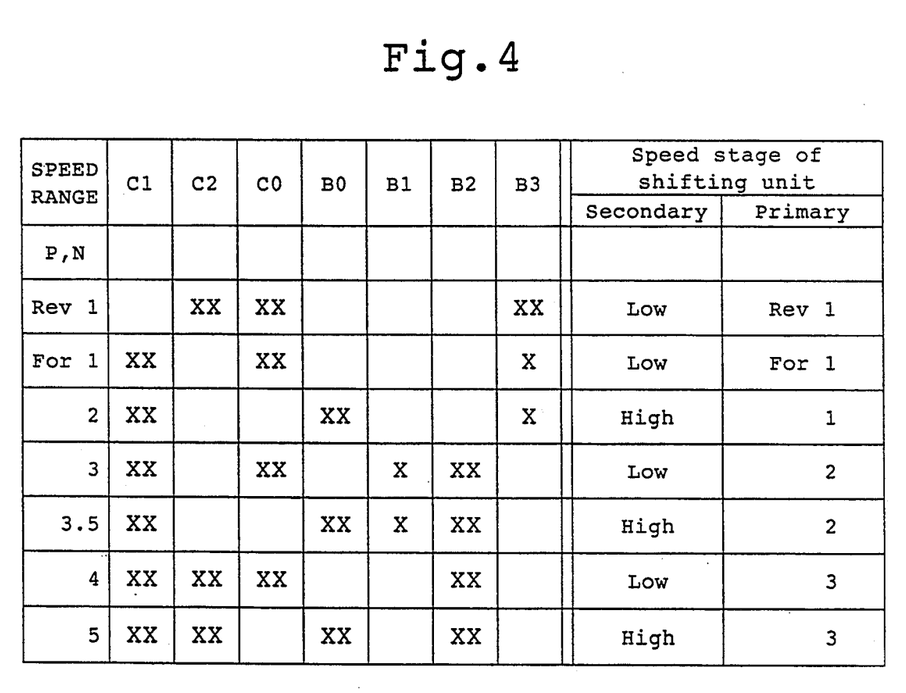
FIG. 4 is a diagram showing the operation of the automatic transmission.

At first speed in each of D-, 3-, 2- and L-ranges, the first solenoid valve is OFF, the second solenoid valve S2 is ON and the third solenoid valve S3 is ON. As a result, the third clutch C0 and the first clutch C1 are engaged, the third one-way clutch F0 and the second one-way clutch F2 are locked, and the others remain released. The overdrive planetary gear unit is therefore locked up via the third clutch C0 and the third one-way clutch F0, whereby rotation of the input shaft 25 is transmitted, as is, to the input shaft 26 of the primary shifting unit 60. In the primary shifting unit 60, on the other hand, the rotation of the in-put shaft 26 is transmitted to the ring gear 62 of the rear-side planetary gear unit via the first clutch C1 and then to the carrier 66 and the output shaft 70 formed integrally with the carrier 66. At this time, counterclockwise rotary force is applied to the carrier 67 of the front-side planetary gear unit via the sun gear 61. The second one-way clutch F2 is however locked so that the carrier 67 is prevented from rotating. The planetary pinion 64 therefore undergoes self-rotation so that decelerated rotation is transmitted to the ring gear 63 formed integrally with the output shaft 70.

At second speed in each of D-, 3- and 2- ranges, on the other hand, the second solenoid valve S2 is ON, and the third solenoid valve S3 is OFF. Accordingly, the third clutch C0 is released, the third one-way clutch F0 is freed, the fourth brake B0 is engaged, and the second one-way clutch F2 is locked.

Here, the overdrive planetary gear unit is switched over so that the third clutch C0 is released, and the fourth brake B0 is engaged. The rotation of the sun gear 43 is therefore inhibited by the fourth brake B0 43, whereby the planetary pinion 42 undergoes self-rotation while the carrier 41 remains rotating. The rotation is hence transmitted to the ring gear 44. As a result, accelerated rotation is transmitted to the input shaft 26 of the locked-up primary shifting unit 60.

In the primary shifting unit 60, the rotation of the input shaft 26 is transmitted to the ring gear 62 of the rear-side planetary gear unit via the first clutch C1. The rotation is then transmitted to the carrier 66 and the output shaft 70 formed integrally with the carrier 66. At this time, counterclockwise rotary force is applied to the carrier 67 of the front-side planetary gear unit via the sun gear 61. The second one-way clutch F2 is however locked so that the carrier 67 is prevented from rotating. As a result, the planetary pinion 67 undergoes self-rotation and transmits the second speed rotation to the ring gear 63 formed integrally with the output shaft 70.

Next, at third speed in each of D-, 3-, 2- and L-ranges, the first solenoid valve S1, the second solenoid valve S2 and the third solenoid valve S3 are all ON. As a consequence, the third clutch C0, the first clutch C1 and the second brake B2 are each engaged, the third one-way clutch F0 and the first one-way clutch F1 are each locked, and the others remain released. The overdrive planetary gear unit is therefore brought into the lockup state , whereby rotation of the input shaft 25 is transmitted, as is, to the input shaft 26 of the primary shifting unit 60. In the primary shifting unit 60, the rotation of the input shaft 26 is transmitted to the ring gear 62 of the rear-side planetary gear unit via the first clutch C1 so that counterclockwise rotary force is applied to the sun gear 61 via the planetary pinion 64. The first one-way clutch F1 is however locked as a consequence of engagement of the second brake B2, whereby the sun gear 61 is prevented from rotation in the counterclockwise direction. Accordingly, the carrier 66 rotates while the planetary pinion 64 undergoes self-rotation. The third speed rotation is hence transmitted to the output shaft 70 via the rear-side planetary gear unit alone.

At fourth speed in each of D- and 3-ranges, the first solenoid valve S1 is ON, the second solenoid valve S2 is OFF and the third solenoid valve S3 is ON. The third clutch C0, the first clutch C1, the second clutch C2 and the second brake B2 are each engaged, the third one-way clutch F0 is locked, and the others remain released. Accordingly, the overdrive planetary gear unit is brought into the lockup state. In the primary shifting unit 60, on the other hand, the rear-side planetary gear unit is integrally connected owing to engagement of the clutches C1, C2 so that the rotation of the input shaft 26 is transmitted, as is, as the fourth speed rotation to the output shaft 70.

Finally, at fifth speed, i.e., the highest speed in D-range, the first solenoid valve S1 is ON, and the second solenoid valve S2 and the third solenoid valve S3 are Off. Accordingly, the first clutch C1, the second clutch C2 and the second brake B2 are each engaged. Although the primary shifting unit 60 is in the lockup state as in the fifth speed, the overdrive planetary gear unit is changed over such that the third clutch C0 is released and the fourth brake B0 is engaged. The sun gear 43 is therefore locked by the fourth brake B0. The planetary pinion 42 hence undergoes self-rotation while the carrier 41 continues to rotate, so that the rotation is transmitted to the ring gear 44. As a consequence, the accelerated rotation is transmitted as the fifth speed rotation to the input shaft 26 of the locked-up primary shifting unit 60.

On the other hand, downshifts are performed as will be described next. Upon 5-4 downshift, the third clutch C) is engaged and at the same time, the fourth brake B0 is released. Upon 4-3 downshift, the second clutch C2 is released. Upon 3-2 downshift, the third clutch C) and the second brake B2 are each released and at the same time, the fourth brake B0 is engaged. Upon 2-1 downshift, the third clutch C0 is engaged and at the same time, the fourth brake B0 is released.

When an unillustrated manual valve is shifted to third, operations of clutches, brakes, etc. at the first, second and fourth speeds are as in the above-described D range. At the third speed, the first brake B1 is also engaged in addition to the first clutch C1, the third clutch C) and the second brake B2 so that the sun gear 61 of the primary shifting unit 60 is locked to apply an engine brake.

When the manual valve is shifted to second, on the other hand, operations of clutches, brakes, etc. at the first speed are as in the above-described D-range. At the second speed, the third brake B3 is also engaged in addition to the first clutch C1 and the fourth brake B0 so that the carrier 67 of the front-side planetary gear unit of the primary shifting unit 60 is locked to apply an engine brake. At the third speed, on the other hand, the first brake B1 is also engaged in addition to the third clutch C0, the first clutch C1 and the second brake B2 so that the sun gear 61 of the primary shifting unit 60 is locked to apply an engine brake.

When the manual valve is shifted to L-range, the third brake B3 is also engaged in addition to the first clutch C1 and the third clutch C0 at the first speed, whereby the carrier 67 of the front-side planetary gear unit of the primary shifting unit 60 is locked to apply an engine brake. At the third speed, on the other hand, the first brake B1 is also engaged in addition to the third clutch C0, the first clutch C1 and the second brake B2 so that the sun gear 61 of the primary shifting unit 60 is locked to apply an engine brake.

In R-range, on the other hand, the first solenoid valve S1 is Off, the second solenoid valve S2 is ON and the third solenoid valve S3 is ON. Accordingly, the third clutch C0, second clutch C2 and third brake B3 are each engaged, the third one-way clutch F0 is locked, and the others remain released. The overdrive planetary gear unit is hence brought into the lockup state. In the primary shifting unit 60, the rotation of the input shaft 26 is transmitted directly to the sun gear 61 by way of the second clutch C2 and the carrier 67 of the front-side planetary gear unit is locked by the third brake B3. The rotation of the sun gear 61 is therefore transmitted as reverse rotation to the ring gear 62 through self-rotation of the planetary pinion 64, whereby the output shaft 70 is rotated in the opposite direction.

Even when the manual valve is shifted to R-range, a vehicle speed faster than a predetermined speed, for example, 9 km/hr or higher turns on the first solenoid valve S1 and releases the second clutch C2. The output shaft 70 therefore does not rotate in the opposite direction.

The hydraulic control circuit in the control system of this invention will next be described with reference to FIG. 5.

Figure 5:
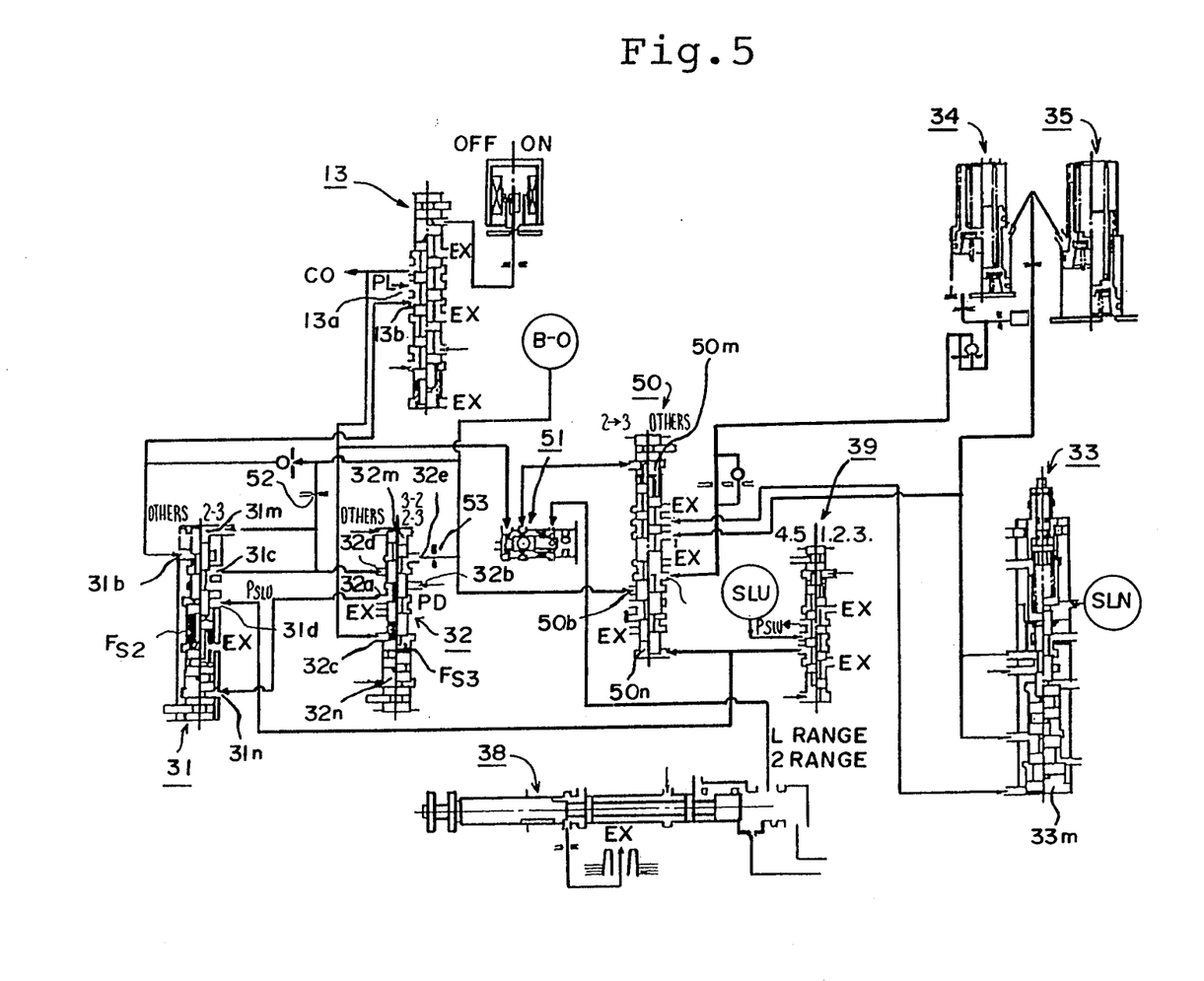
FIG. 5 is a fragmentary block diagram of a hydraulic control circuit in the control system of the invention.

In FIG. 5, designated at numeral 13 is the third shift valve for changing over the feed/drain of hydraulic fluid to/from the hydraulic servomotor B-0 for the fourth brake B0. The third shift valve 13 is controlled by turning on or off the third solenoid valve S3. There are also illustrated the B-0 control valve 31 for controlling the hydraulic pressure upon releasing the fourth brake B0, a first relay valve 32, an accumulator control valve 33 for controlling the back pressures of the accmulators attached to the individual hydraulic servomotors, a B-0 accumulator 34 for regulating rise in hydraulic pressure upon engaging the fourth brake B0, a manual valve 38 operated in association with a shift lever arranged adjacent to the solenoid relay valve 39, a second relay valve 50 and a check valve 51.

The accumulator control valve 33 has a control fluid compartment 33m in a lower end thereof. Upon 2-3 upshift, the back pressure of the B-0 accumulator 34 is supplied to the control fluid compartment 33m via the second relay valve 50 so that the back pressure of the B-0 accumulator 34 is reduced.

Upon 2-3 upshift and 3-2 downshift, hydraulic fluid is supplied to a control chamber 32m in an upper end of the first relay valve 32 so that the first relay valve 32 assumes the position shown on the right-hand half side. In first, third and fourth speeds, the fluid is fed to an intermediate control fluid compartment so that the first relay valve 32 takes a control position. At the fourth and fifth speeds, the fluid is supplied to a control chamber 32n in a lower end of the first relay valve 32 so that the first relay valve 32 takes the position illustrated on the left-hand half side. Upon 2-3 up shift, the first relay valve 32 assumes the position shown on the right-hand half side to control drain of the fourth brake B0.

Upon 3-2 downshift, the second relay valve 50 and the hydraulic servomotor B-0 are brought into communication with each other, whereby the servomotor B-0 is promptly engaged.

Upon 1-2 upshift and 4-5 upshift, the valve 32 takes the left-hand half position so that the fluid of line pressure PL from the manual valve 38 is supplied to the control chamber 31n in a lower end of the B-0 control valve 31 via ports 32b, 32a so that the B-0 control valve 31 is fixed in the left-hand half position.

The B-0 control valve 31 has an orifice circuit which connects a port 31b and a port 31c with each other, so that the control pattern of feed/drain of fluid for the hydraulic servomotor B-0 is switched over. At the second speed the fluid of the first relay valve 32 is supplied to the control chamber 31n in the lower end so that the first relay valve 32 assumes the left-hand half position to supply the fluid from the third shift valve 13 to the hydraulic servomotor B-0. At the beginning of a 2-3 upshift, however, the first relay valve 32 is switched over, and the fluid of the control chamber 31n in the lower end is drained so that the B-0 control valve 31 takes the right-hand half position. As a consequence, the orifice circuit is closed to cut off the third shift valve 13 and the hydraulic servomotor B-0 from each other. Accordingly, the engaging hydraulic pressure of the hydraulic servomotor B-0 is retained at the beginning of the 2-3 upshift.

In the shifts other than the 2-3 upshift, the fluid of the first relay valve 32 is supplied to the control chamber 31n in the lower end so that the B-0 control valve 31 takes the left-hand half position. The orifice circuit is therefore opened upon 1-2 upshift or 4-5 upshift, whereby the fluid can be promptly supplied to the hydraulic servomotor B-0 through the orifice circuit. Upon 2-3 upshift, the fluid of control pressure $P_{SLU}$ from the linear solenoid valve SLU is supplied to the intermediate control chamber via the solenoid relay valve 39 so that the engaging hydraulic pressure of the hydraulic servomotor B-0 is feed/pack controlled to drain the fluid of the hydraulic servomotor B-0.

In the second relay valve 50, the fluid of line pressure $P_L$ is fed to a control chamber 50m in an upper end of the second relay valve 50 and the fluid of control pressure $P_{SLU}$ of the linear solenoid valve SLU is supplied to a control fluid compartment 50n in a lower end via the solenoid relay valve 39. Simultaneously with the initiation of a 2-3 upshift, the fluid from the linear solenoid valve SLU is supplied so that the second relay valve 50 assumes the left-hand half position. The hydraulic servomotor B-0 for the fourth brake B0 and the B-0 accumulator 34 are hence cut off from each other to independently control drainage of the fluid from the hydraulic servomotor B-0. For this purpose, the third solenoid valve S3 is maintained in the OFF state during the 2-3 upshift.

At this time, the fluid which is supplied from the accumulator control valve 33 to back-pressure compartments, such as the B-0 accumulator 34 and B-2 accumulator 35, is simultaneously supplied as a signal hydraulic pressure to the control chamber 33m of the accumulator control valve 33, so that the back pressure is reduced to about 75% of the normal level. Upon the shifts other than the 2-3 upshift, the fluid of line pressure $P_L$ is supplied to the control chamber in the upper end so that the accumulator control valve 33 takes the right-hand half position.

Control of draining the fluid from the hydraulic servomotor B-0 for the fourth brake B0, in other words, releasing the fourth brake B0, will next be described.

In the illustrated automatic transmission, only 2-1 downshift, 5-4 downshift and 2-3 upshift require release of the fourth brake B0. Among these, the 2-1 downshift and 5-4 upshift are both performed without any changes to the primary shifting unit 60 so that the release of the fourth brake B0 does not require any special consideration. In contrast, the 2-3 upshift requires extremely precise pressure regulation and control because the primary shifting unit 60 simultaneously conducts an upshift from the first range to the second range.

Upon releasing the fourth brake B0, the line can therefore be switched over depending on whether the secondary shifting unit 40 is shifted singly or the primary shifting unit 60 and the secondary shifting unit 40 are simultaneously shifted in combination.

Upon 2-3 upshift, the second relay valve 50 is set in the left-hand half position, namely, in the state that the fluid from the check valve 51 is not supplied to the control chamber 50m, whereby the port 50b and the port 50c are cut off from each other in the second relay valve 50.

As a result, the line between the B-0 accumulator 34 and the hydraulic servomotor B-0 for the fourth brake B0 is cut off. This makes it possible to freely control the B-2 accumulator 35, which is attached to the second brake B2 to achieve the shift stages of the primary shifting unit 60, by the linear solenoid valve SLN and the accumulator control valve 33 and, moreover, to keep the hydraulic servomotor B-0 absolutely free from any influence of the control.

On the other hand, the first relay valve 32 takes the right-hand half position so that the fluid of D-range pressure $P_D$ of the control chamber 31n of the B-0 control valve 31 is drained to make the B-0 control valve 31 ready to perform pressure regulation.

When the B-0 control valve 31 is in the right-hand half position, in other words, the fluid of D-range pressure $P_D$ on the control chamber 31n has been drained as described above, the line pressure $P_L$ is regulated by control pressure $P_{SLU}$ supplied to a port 31d and spring force $F_{S2}$ so that the fluid pressure so regulated is delivered from the port 31c. Incidentally, the fluid at control pressure $P_{SLU}$ supplied to the port 31d is fed from the linear solenoid valve SLU by way of the solenoid relay valve 39.

To drain the fluid from the hydraulic servomotor B-0 for the fourth brake B0, the fluid at control pressure $P_{SLU}$ which has been regulated by the linear solenoid valve SLU is supplied to the B-0 control valve 31. The pressure of the fluid is hence regulated by the B-0 control valve 31, thereby making it possible to precisely regulate the hydraulic pressure of the fluid upon release of the fourth brake B0.

Incidentally, the illustrated automatic transmission is designed in such a way that at the second speed, the fourth brake B0 is engaged; at the third and fourth speeds, the fourth brake B0 is released and the second brake B2 is engaged; and at the fifth speed, the fourth brake B0 is engaged again Operation to engage or disengage the fourth brake B0 will next be described.

Shifts involving the engagement of the fourth brake B0 can be divided into two groups, one being cases where only the secondary shifting unit 40 performs a shift (for example, 1-2-upshift and 4-5 upshift) and the other being cases where combined shift is performed such that the primary shifting unit 60 performs a downshift and the secondary shifting unit 40 executes an upshift (for example, 3-2 downshift). In the latter cases where a speed stage can be achieved through a combined shift of the primary shifting unit 60 and the secondary shifting unit 40, it is desired from the standpoint of sequence control of the shifting to minimize the time lag until the engagement of the fourth brake B0. In the former cases where only the secondary shifting unit 40 performs a shift, on the other hand, such a special consideration is not needed. From the standpoint of shifting characteristics, it is rather preferable to have the fourth brake B0 engage at a relatively low speed.

To engage the fourth brake B0, the third solenoid valve S3 is turned off, the third shift valve 13 assumes the left-hand half position, and the fluid at line pressure $P_L$ supplied to a port 13a is delivered through a port 13b.

On the other hand, the B-0 control valve 31 takes the left-hand half position (i.e., the state that the port 32a and the port 32b have been connected together in the first relay valve 32 and the fluid of drain pressure $P_D$ has been supplied to the control chamber 31n of the B-0 control valve 31) so that the fluid at line pressure $P_L$ supplied to the port 31b is discharged, as is, through the port 31c without any regulation in pressure.

In the first relay valve 32, the fluid at the engaging hydraulic pressure for the second brake B2 is supplied to the control chamber 32m, the fluid at the engaging hydraulic pressure for the second clutch C2 is fed to the port 32c and the fluid at the engaging hydraulic pressure for the second clutch C2 is supplied to the control chamber 32n. Depending on the difference between the engaging hydraulic pressures and the spring force $F_{S3}$, the port 32a and the port 32b are connected together or cut off from each other. Upon 3-2 downshift, the fluid at the engaging hydraulic pressure for the second brake B2 is supplied to the control chamber 32m so that the first relay valve 32 takes the right-hand half position to increase the fluid to be supplied to the fourth brake B0.

When a decision for a 3-2 downshift is made, because the line for feeding fluid to the hydraulic servomotor B-0 for the fourth brake B0 is composed of two lines, one being the line with a smaller orifice 52 and the other the line with a larger orifice 53, the fourth brake B0 is promptly engaged.

Upon 1-2 upshift or 4-5 upshift in which the fourth brake B0 is also changed from the released state into the engaged state as in the 3-2 downshift, the first relay valve 32 takes the left-hand half position so that fluid is fed to the hydraulic servomotor B-0 for the fourth brake B0 only through the line with the smaller orifice 52.

When fluid is supplied to the hydraulic servomotor B-0 for the fourth brake B0, the B-0 accumulator 34 is connected and hence functions irrespective of whether the fluid is supplied only through the line with the smaller orifice 52 or through both the line with the smaller orifice 52 and the line with the larger orifice 53.

In the second relay valve 50, the control chamber 50m is fed with fluid from the check valve 51 so that the second relay valve 50 is designed to take the right-hand half position upon all the shifts other than the 2-3 upshift. Further, the check valve 51 is designed such that, when the engaging hydraulic pressure for the fourth clutch C0, L-range pressure or 2-range pressure is produced, fluid of the corresponding pressure is delivered.

When fluid is supplied to the hydraulic servomotor B-0 for the fourth brake B0 (i.e., when the fourth brake B0 is engaged), its transition characteristics are controlled basically by the B-0 accumulator 34. The B-0 accumulator 34 is controlled by the linear solenoid valve SLN and the accumulator control valve 33. When the fourth brake B0 is engaged, on the other hand, the fluid is supplied from the first relay valve 32 to the control chamber 31n so that the B-0 control valve assumes the left-hand half position and provides no pressure-regulating function.

As has been described above, each shift is controlled primarily by the pressure regulating function of the B-0 accumulator 34 when the fourth brake B0 remains engaged.

Next will be described operation which takes place when a decision for a second shift is made in the course of a combined shift by the primary shifting unit and the secondary shifting unit.

As has been described above, upon 2-3 upshift, the line between the B-0 accumulator 34 and the hydraulic servomotor B-0 is cut off and the B-0 control valve 31 is made ready to regulate the pressure. Fluid of control pressure $P_{SLU}$, said fluid having been regulated in pressure by the linear solenoid valve SLU, is supplied to the B-0 control valve 31 so that the fluid of the hydraulic servomotor B-0 can be drained under minute control.

If a decision for a shift to the fifth speed is made while the fluid of the hydraulic servomotor B-0 is drained under such minute control, it becomes necessary to engage the fourth brake B0 again so that the once-disconnected B-0 accumulator 34 is connected again. At this time, the fluid in the line is supplied to the B-0 accumulator 34, whereby the hydraulic pressure in the hydraulic servomotor B-0 abruptly drops although this pressure drop is temporary. Overall, the effect on the whole automatic transmission of the rapid downshift during the combined shift accordingly makes the shift shock greater.

The creation of such a shift shock is hence avoided by delaying the shift to the fifth speed, creating an accelerated state once, and then performing a 2-3, 5-5 upshift.

This will hereinafter be described with reference to FIGS. 1 and 6, which are the flow chart and time chart of the control system of this invention, respectively.

In the control system of this invention, the electronic control unit 104 is equipped with shift deciding means. Based on signals representing running conditions of the vehicle such as a vehicle speed signal and a throttle opening signal, this shift deciding means makes a decision as to whether a shift is to be performed or not and, when a shift point is reached, outputs a shift signal to the hydraulic control circuit 106.

If a shift signal for the fifth speed is produced as a decision for a second shift in the course of a combined shift by the primary shifting unit 60 and the secondary shifting unit 40, namely, during the 2-3 up-shift, the output of the shift signal can be delayed by a preset time.

Upon the 2-3 upshift, the fluid at control pressure $P_{SLU}$, said fluid having been regulated in pressure by an electrical signal at the linear solenoid valve SLU, is supplied to the intermediate control chamber of the B-0 control valve 31 so that the fluid in the hydraulic servomotor B-0 is drained under control. In the control system of this invention, the execution of the decision for the second shift controls the electrical signal to be sent to the linear solenoid valve SLU so that the control pressure $P_{SLU}$ is changed to gradually raise the hydraulic pressure $P_{BO}$ in the hydraulic servomotor B-0. While maintaining the primary shifting unit 60 at the second speed, there is created the 3.5th speed at which the secondary shifting unit 40 remains in an accelerating state.

During the above operation, the revolution speeds $N_{C0}$, $N_{C2}$ of rotating members in the automatic transmission are detected by revolution speed sensors arranged facing clutch drums of the third clutch C0 and the second clutch C2, respectively. As soon as an accelerating state is completely achieved and the revolution speed $N_{C0}$ of the third clutch C0 drops substantially to zero, the supply of the fluid to the hydraulic servomotor C-2 for the second clutch 2 is initiated to perform a shift to the fifth speed.

The hydraulic pressure in the hydraulic servomotor C-2 for the second clutch C2 is controlled by transition characteristics of the C-2 accumulator.

Step S1—Determine whether or not a decision for a second shift is made.

Step S2—The hydraulic pressure $P_{B0}$ in the hydraulic servomotor B-0 is increased.

Step S3—Decide whether the 3.5th speed is configured or not. Advance to Step S4 when it is configured but otherwise return to Step S1.

Step S4—Output the second shift.

Figure 6:
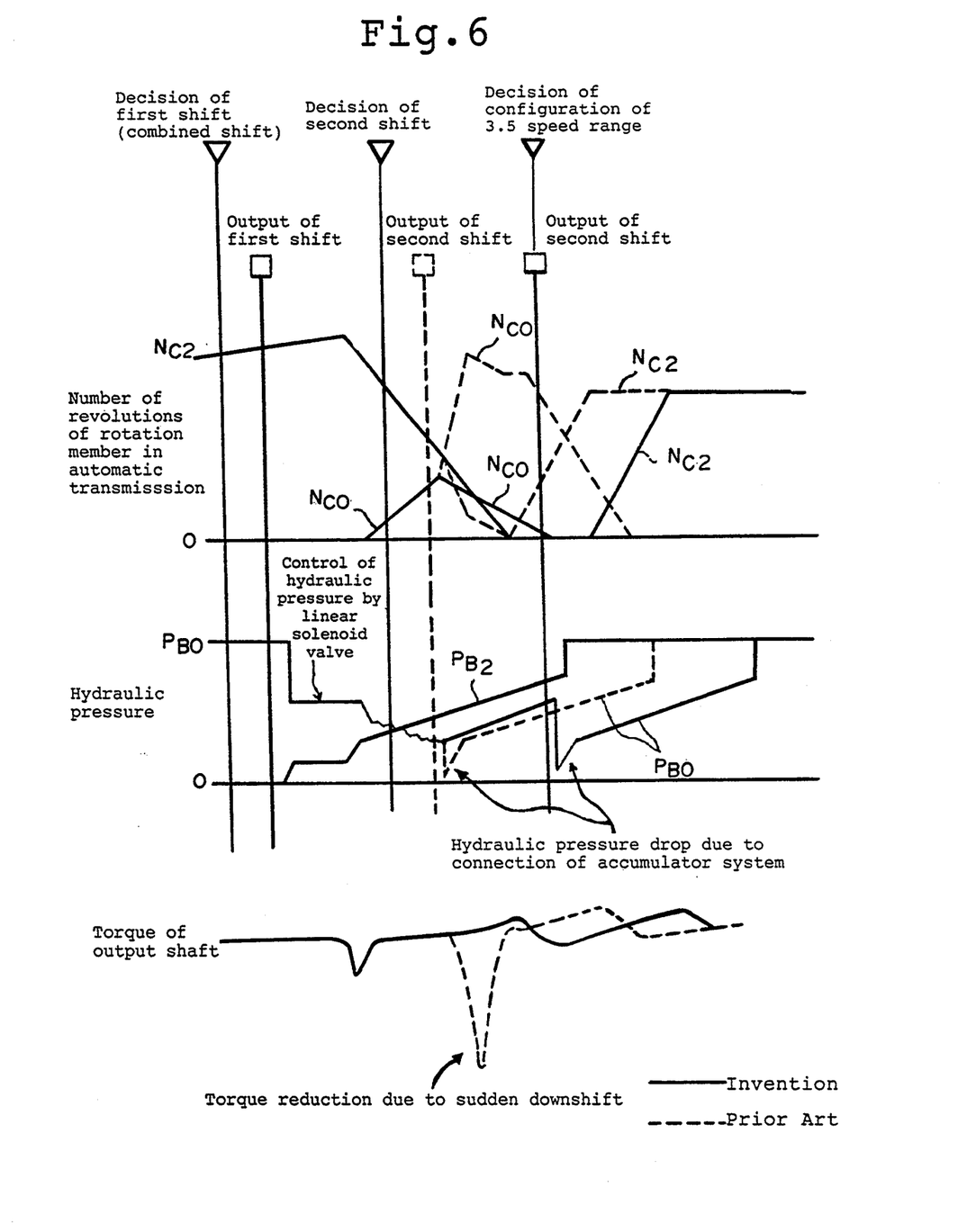
FIG. 6 is a time chart for the control system.

In FIG. 6, dashed lines indicate operations in a conventional control system for an automatic transmission while solid lines represent operations in the control system of this invention.

As is illustrated in the figure, when a decision for a 2-3 upshift is made as a decision for a first shift, a first shift signal is inputted to the hydraulic control circuit 106. As a result, fluid at control pressure $P_{SLU}$ said fluid having been regulated in pressure by an electrical signal at the linear solenoid valve SLU, is supplied to the B-0 control valve 31 so that the fluid in the hydraulic servomotor B-0 is drained under control.

During the above operation, the hydraulic pressure $P_{B2}$ in the hydraulic servomotor B-2 gradually increases under control by the B-2 accumulator 35.

When a decision for a shift to the fifth speed is made as a decision of a second shift before the 2-3 upshift is completed, a shift signal is generated as a second shift output. This shift signal is, however, delayed by a predetermined time and, during the predetermined time, it is not inputted to the hydraulic control circuit 106. Subsequently, the electronic control unit 104 delivers an electrical signal to the linear solenoid valve SLU so that pressure-regulated fluid for the control pressure $P_{SLU}$ is supplied to the B-0 control valve 31 and the fluid is supplied under control to the hydraulic servomotor B-0. At this time, the hydraulic servomotor B-0 and the B-0 accumulator 34 are cut off by the second relay valve 50.

When the hydraulic pressure $P_{B0}$ in the hydraulic servomotor B-0 for the fourth brake B0 has risen, the engagement of the fourth brake B0 has been completed and the 3.5th speed has been configured, a shift signal for the fifth speed is outputted as a second shift signal to the hydraulic control circuit 106. Accordingly, the hydraulic servomotor B-0 and the B-0 accumulator 34 are connected together so that the hydraulic pressure $P_{B0}$ in the hydraulic servomotor B-0 for the fourth brake B0 increases under control by the B-0 accumulator 34.

In this case, the hydraulic pressure $P_{B0}$ drops when the B-0 accumulator 34 is connected again. However, the shift shock is small. Since the fourth brake B0 has already been in a substantially engaged state when the hydraulic pressure $P_{B0}$ drops, there is no significant influence on the torque of the output shaft even if the braking action is temporarily lost due to the drop in the hydraulic pressure $P_{B0}$. As a result, the shift shock is small.

It is to be noted that the present invention is not limited to the embodiment described above. A variety of changes and modifications are feasible in keeping with the spirit of the present invention. Such changes and modifications should not be excluded from the scope of the present invention.

We claim:

1. A control system for an automatic transmission having a primary shifting unit and a secondary shifting unit connected to the primary shifting unit and capable of achieving multi-stage speed ranges for a vehicle by selective operation of frictional engagement elements contained in said shifting units, at least one of the frictional engagement elements providing for downshifting, comprising:

means for detecting running conditions of the vehicle and for generating signals representative of the detected running conditions;

decision means for deciding, on the basis of said running condition signals, whether or not a first shift is needed, for deciding whether or not a second shift is needed, for generating a first shift signal when need for the first shift is decided and for generating a second shift signal when need for the second shift is decided;

a hydraulic control circuit including hydraulic servomotors, accumulators respectively associated with said hydraulic servomotors and valve means for selectively feeding and draining hydraulic fluid to and from said plural hydraulic servomotors for the selective operation of the frictional engagement elements responsive to receipt of said shift signals from said decision means;

servomotor pressure control means for controlling pressure of the hydraulic fluid fed to said hydraulic servomotors; and means for detecting speed of revolution of a rotating member in the automatic transmission;

wherein said servomotor pressure control means comprises:

means for hydraulically disconnecting one of said hydraulic servomotors from its associated accumulator, said one hydraulic servomotor controlling the one frictional engagement element provided for downshifting, and means for controlling hydraulic pressure in said one hydraulic servomotor responsive to a first electric signal indicative of a decision for a first shift in which the primary and secondary shifting units perform a combined shift with one of the primary and secondary shifting units performing a downshift and the other performing an upshift; and means for controlling the hydraulic pressure in said one hydraulic servomotor, responsive to a second electrical signal generated responsive to a decision for a second shift in the course of the combined shift, to return said one frictional engagement element to its position before the combined shift to configure a particular speed stage.

* * * * *

UNITED STATES PATENT AND TRADEMARK OFFICE
CERTIFICATE OF CORRECTION

PATENT NO. : 5,339,709
DATED : August 23, 1994
INVENTOR(S) : SUZUKI et al

It is certified that error appears in the above-indentified patent and that said Letters Patent is hereby corrected as shown below:

Col. 2, line 30, after "a" insert --second--.

Col. 5, line 56, begin a new paragraph with "The".

Col. 7, line 30, "C)" should read --CO--;

line 32, "C)" should read --CO--; and line 42, "C)" should read --CO--.

Col. 9, line 28, "feed/pack" should read --feedback--.

Signed and Sealed this

Twenty-fifth Day of July, 1995

Attest:

BRUCE LEHMAN

*Attesting Officer*      *Commissioner of Patents and Trademarks*

UNITED STATES PATENT AND TRADEMARK OFFICE
CERTIFICATE OF CORRECTION

PATENT NO. : 5,339,709
DATED : August 23, 1994
INVENTOR(S) : SUZUKI et al

It is certified that error appears in the above-indentified patent and that said Letters Patent is hereby corrected as shown below:

Title page, item [75]

"Hiromachi KIMURA" should read --Hiromichi KIMURA--.

Signed and Sealed this

Ninth Day of January, 1996

Attest:

BRUCE LEHMAN

Attesting Officer

Commissioner of Patents and Trademarks